Patented Aug. 15, 1939

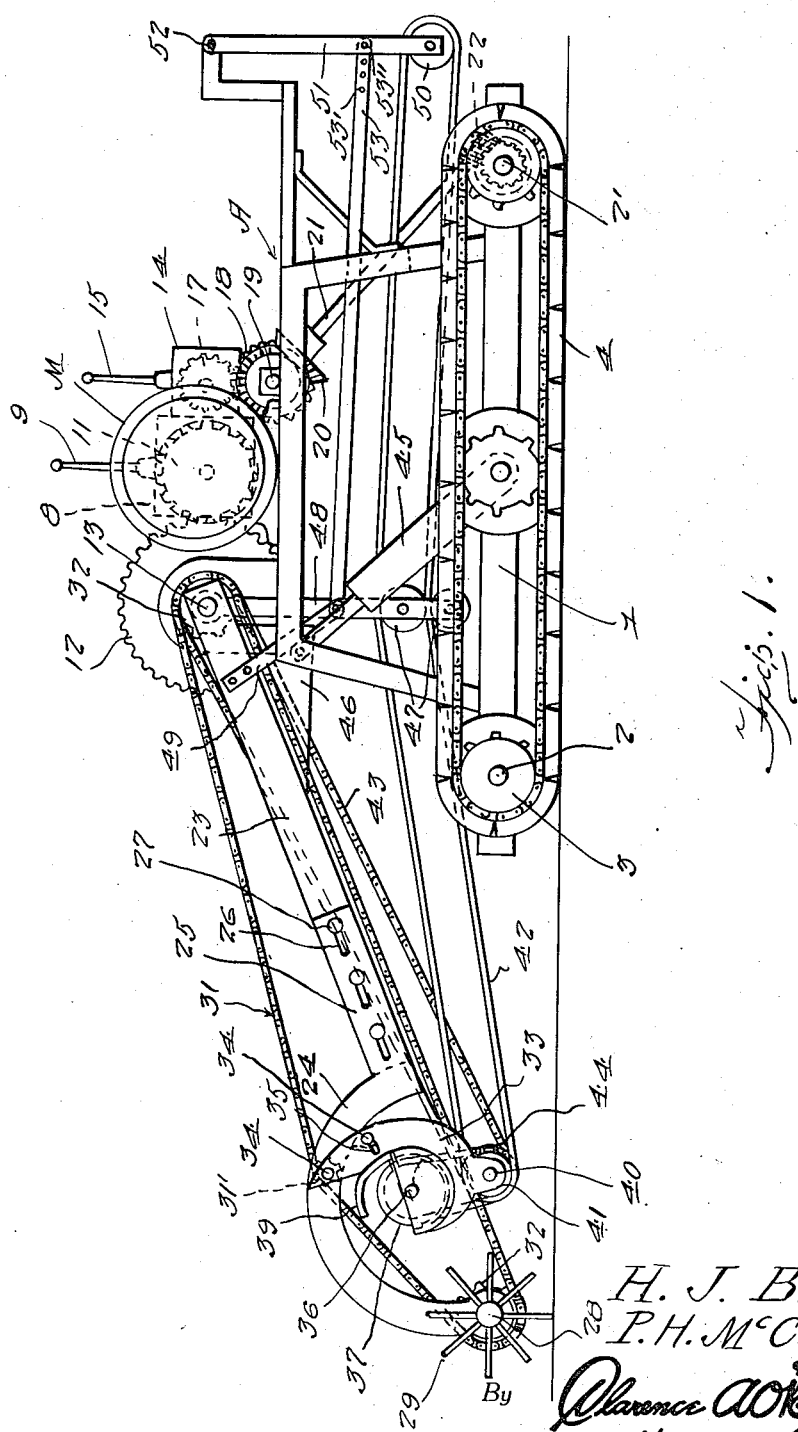

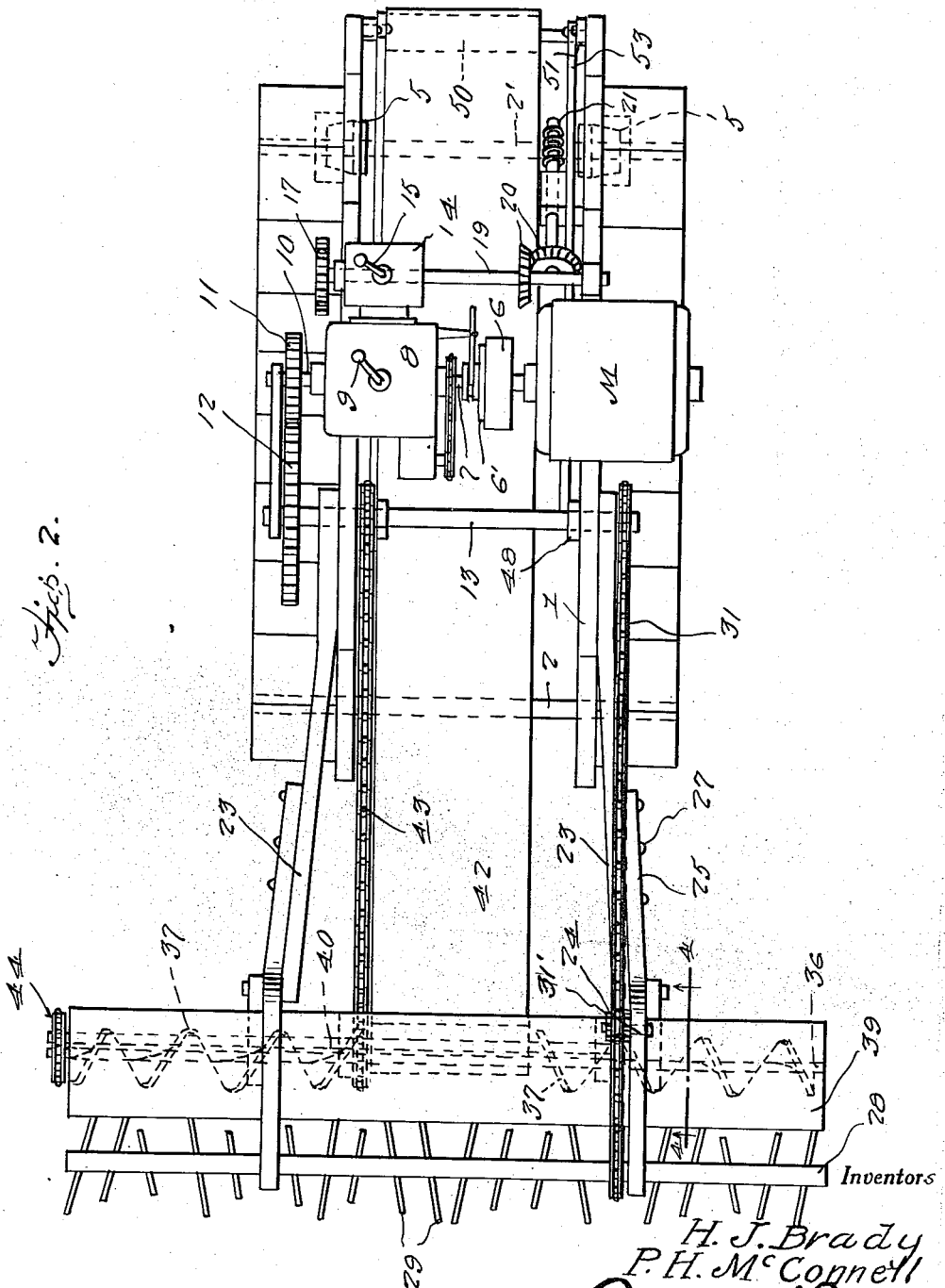

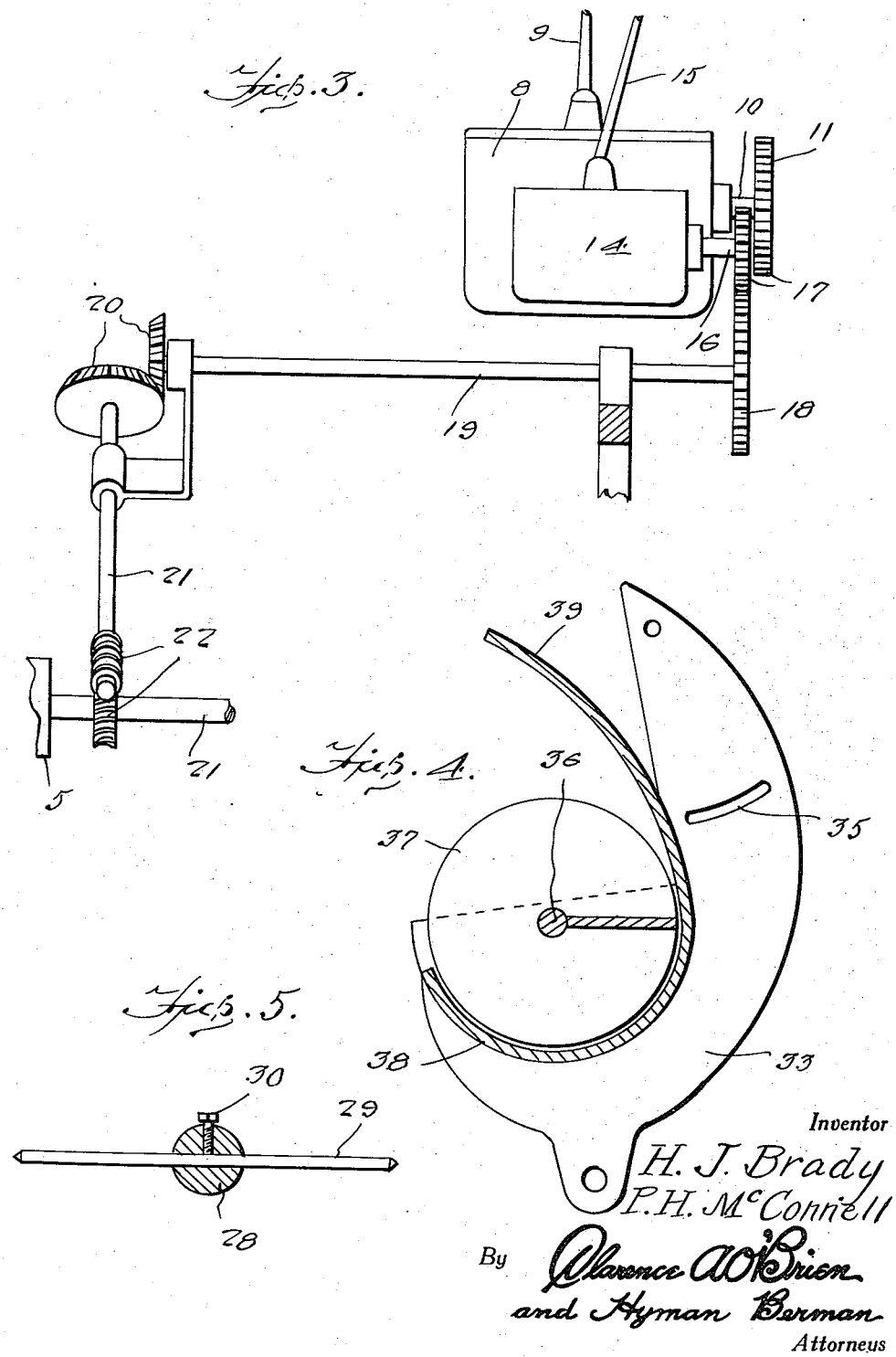

2,169,518

UNITED STATES PATENT OFFICE 2,169,518

TRENCH DIGGING MACHINE

Henry J. Brady, McCone City, and Philip H. McConnell, Park Grove, Mont.

Application December 10, 1938, Serial No. 245,004

3 Claims. (Cl. 37—96)

This invention relates to a trench digging machine, the general object of the invention being to provide a frame provided with endless members for engaging the ground surface and driven from a motor on the frame, a rotary shaft at the front of the frame also driven from the motor and carrying a plurality of cutting members, conveying means for conveying the dirt to a point in rear of the device and means for lowering and raising the cutting means so that said means can cut the face of a trench while the cutting means are being lifted.

Another object of the invention is to provide control means so that the cutting and conveying means can be actuated while the endless ground engaging members are stationary and vice versa.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is an elevation of the apparatus.

Figure 2 is a top plan view thereof.

Figure 3 is a rear view of the transmission means and showing the drive means for the rear axle.

Figure 4 is a sectional view taken on line 4—4 of Figure 2.

Figure 5 is a sectional view through the cutter bar showing how a tooth is held therein.

In these drawings, the letter A indicates the frame of the apparatus which includes the side beams 1 connected together in any suitable manner and in which are supported the axles 2 for the wheels and sprockets shown generally at 3 for the endless members 4, one of these endless members and the supporting means being located at each side of the frame. The endless members may be of any suitable form. The rear axle 2' is rotatably supported and is provided with clutch means shown generally at 5 for connecting it with the members 3 so that by manipulating these clutch means in any suitable manner the endless members can be controlled for turning the apparatus. The frame supports a motor M, the shaft of which is provided with a clutch part 6 for engaging the clutch part 6' of a shaft 7 which is connected with transmission means in the casing 8, the control lever of which is shown at 9. This transmission means operates a shaft 10 to which a gear 11 is connected and this gear meshes with a gear 12 on one end of a shaft 13 journaled in the frame in advance of the motor.

A second transmission means is located in the housing 14 and is controlled by the lever 15, the second transmission means being suitably driven from the shaft 7 and the shaft 16 of the second transmission means 14 carries a gear 17 which meshes with the gear 18 on a shaft 19 journaled in the frame, and beveled gears 20 connect the shaft 19 with the shaft 21 which drives the rear axle 2' through the worm gearing 22 as shown more particularly in Figure 3. The transmission means in the housings 8 and 14 are so constructed and arranged that those in the housing 8 can be moved to a neutral position so that the shaft 13 will remain idle while the shaft 16 is being driven through the transmission means in housing 14 or the transmission means in housing 14 can be moved to a neutral position and those in the housing 8 moved to a position to rotate the gears 11 and 12 to rotate the shaft 13. This enables the entire apparatus to remain stationary while the shaft 13 is being rotated and to permit the apparatus to be moved through means of the endless members 4 while the shaft 13 is stationary. We prefer to make the transmission means in the housing 8 with four speeds in one direction and a reverse speed and to make those in the transmission housing 14 with two speeds and a reverse.

A pair of arms 23 is pivotally supported at their rear ends on the shaft 13 and if desired bushings can form the pivots of these arms, with the shaft 13 passing therethrough. A substantially semi-circular member 24 is adjustably connected to the front end of each arm 23 by a shank 25 having slots 26 therein through which pass bolts 27 carried by the arm 23. An elongated cutter bar or shaft 28 is journaled in the front ends of the members 24 and carries a plurality of cutting bars 29 which are preferably arranged in inclined position, as shown in Figure 2 and each bar passes through a hole in the cutter bar and is adjustably held in place by a set screw 30 as shown in Figure 5. This cutter bar 28 is driven from the shaft 13 through means of the endless chain 31 and the sprockets 32 on said shaft 13 and the cutter bar 28.

A bracket 33 depends from each member 24 and is fastened to said member 24 by the bolts 34 one of which passes through a slot 35 in the bracket so that the bracket can be swung or adjusted toward and away from the cutter bar 28. A shaft 36 is journaled in these brackets and said shaft carries a pair of spiral conveyors 37 which have their inner ends spaced apart and these conveyors are so arranged as to move material inwardly. These conveyors operate in a trough 38 supported by the brackets 33 and the rear wall of the trough extends upwardly as shown at 39 to form a shield. A shaft 40 is journaled in the lower portions of the brackets 33 and carries a roller 41 at its central portion for a conveyor belt 42, the trough 39 having an opening at its bottom at a central portion so that the material moved by the spiral conveyors 37 toward the central portion of the trough can drop through this opening upon the conveyor 42 which extends rearwardly as shown. The shaft 40 is driven from the shaft 13 by means of an endless chain 43 passing over suitable sprockets on the shafts 13 and 40. The spiral conveyor shaft 36 is driven from the shaft 40 through suitable sprockets and an endless chain shown generally at 44. The arms 23 are raised and lowered through means of suitably controlled jacks shown generally at 45, these jacks being suitably supported from the frame A and having their piston rods connected to the depending portions 46 connected with the upper ends of the arms 23.

Idle rollers 47 are carried by the hangers 48 suspended from the shaft 13 and connected by straps 49 to the arms 23 so that the hangers are caused to move with the arms. One idle roller is located between the upper and lower reaches of the conveyor belt 42 and the other one has the lower reach of the belt passing thereover. A roller 50 is provided for the rear end of the belt 42 and is carried by the hangers 51 pivoted to a part of the frame at their upper ends as shown at 52 and these hangers 51 are connected by links 53 with the hangers 48 so that the hangers 51 will move with the hangers 48. This arrangement will prevent the belt 42 from interfering with the swinging movement of the arms 23 while keeping the belt taut.

Thus it will be seen that the apparatus can be driven along under its own power and by dropping the arms 23 through means of the jacks 45 the cutting means including the shaft 28 and the bits 29 will dig into the earth and the dirt will be thrown into the trough 38 where it will be engaged by the spiral conveyors 37 which move the dirt inwardly from both ends of the trough upon the conveyor belt 42 which carries the dirt rearwardly of the machine and it can be picked up in any suitable manner. After the trench has been started and is of considerable depth the machine is moved along until the cutting means engages the lower part of the face of the trench wall and then the jacks are manipulated to raise the arms 23 so that the cutting means will cut from underneath upwardly as the arms are being raised by the jacks. Of course, during this cutting operation the transmission means in housing 14 are in neutral position so that the apparatus will remain stationary. Then after a portion of the face has been removed the apparatus is again moved forwardly and the arms dropped to begin a new cut on the face.

An idle sprocket 31' is rotatably carried on one of the arms 24 and the upper reach of the chain 31 passes over this sprocket, as shown in Fig. 1. By adjusting the arm 24 and the bracket 33 the chains 31 and 43 and belt 42 can be tightened. We also provide a plurality of holes 53' in the links 53 for receiving the bolts 53'' which connect each link 53 with a member 51 which also enables the belt 42 to be tightened or loosened as desired. Also the idle sprocket 31' can be adjusted in any suitable manner to tighten or loosen the chain 31.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is—

1. A trenching and tunneling machine of the class described comprising a portable supporting frame, a motor on the frame, a pair of forwardly extending arms pivotally supported at their rear ends to the front part of the frame, a cutter bar carried by the forward portions of the arms, bits carried by the cutter bar, means for rotating the cutter bar from the motor, a trough carried by the arms and paralleling and arranged close to the cutter bar, a rotary shaft passing through the trough, a pair of oppositely arranged spiral conveyors connected with the shaft and having their inner ends spaced apart, conveying means for receiving the material moved along the trough by the spiral conveyors for moving such material rearwardly of the frame, means for operating the conveyor and the spiral conveyors from the motor and means for raising and lowering the arms.

2. A trenching and tunneling machine of the class described comprising a portable supporting frame, a motor on the frame, a pair of forwardly extending arms pivotally supported at their rear ends to the front part of the frame, a cutter bar carried by the forward portions of the arms, bits carried by the cutter bar, means for rotating the cutter bar from the motor, a trough carried by the arms and paralleling and arranged close to the cutter bar, a rotary shaft passing through the trough, a pair of oppositely arranged spiral conveyors connected with the shaft and having their inner ends spaced apart, conveying means for receiving the material moved along the trough by the spiral conveyors for moving such material rearwardly of the frame, means for operating the conveyor and the spiral conveyors from the motor, means for raising and lowering the arms, and transmission means for connecting and disconnecting the motor to the conveying means and the cutter bar.

3. A trenching and tunneling machine of the class described comprising a portable supporting frame, a motor on the frame, a pair of forwardly extending arms pivotally supported at their rear ends to the front part of the frame, a cutter bar carried by the forward portions of the arms, bits carried by the cutter bar, means for rotating the cutter bar from the motor, a trough carried by the arms and paralleling and arranged close to the cutter bar, a rotary shaft passing through the trough, a pair of oppositely arranged spiral conveyors connected with the shaft and having their inner ends spaced apart, conveying means for receiving the material moved along the trough by the spiral conveyors for moving such material rearwardly of the frame, means for operating the conveyor and the spiral conveyors from the motor, means for raising and lowering the arms, means for adjusting the length of the arms and means for adjusting the trough toward and from the cutter bar.

HENRY J. BRADY.
PHILIP H. McCONNELL.